United States Patent
Mueller et al.

(10) Patent No.: US 9,422,465 B2
(45) Date of Patent: Aug. 23, 2016

(54) EMULSION ADHESIVE FOR WASHABLE FILM

(75) Inventors: Alfredo Mueller, Zurich (CH); Jos Van Noort, Leiden (NL); Graham Yeadon, Marbach (CH)

(73) Assignee: Avery Dennison Corporation, Glendale, CA (US)

( * ) Notice: Subject to any disclaimer, the term of this patent is extended or adjusted under 35 U.S.C. 154(b) by 1237 days.

(21) Appl. No.: 12/447,478

(22) PCT Filed: Nov. 1, 2007

(86) PCT No.: PCT/US2007/083312
§ 371 (c)(1),
(2), (4) Date: Jul. 30, 2009

(87) PCT Pub. No.: WO2008/057926
PCT Pub. Date: May 15, 2008

(65) Prior Publication Data
US 2010/0051200 A1    Mar. 4, 2010

Related U.S. Application Data

(60) Provisional application No. 60/864,028, filed on Nov. 2, 2006.

(51) Int. Cl.
- *B32B 27/30* (2006.01)
- *C08K 5/17* (2006.01)
- *C08L 33/02* (2006.01)
- *C09J 133/08* (2006.01)

(52) U.S. Cl.
CPC ......... *C09J 133/08* (2013.01); *C09J 2203/334* (2013.01); *Y10T 156/1111* (2015.01); *Y10T 156/1142* (2015.01); *Y10T 156/1153* (2015.01); *Y10T 428/24942* (2015.01); *Y10T 428/2891* (2015.01)

(58) Field of Classification Search
CPC ....................................................... C09J 133/08
USPC ................................. 524/556, 559, 560, 561
See application file for complete search history.

(56) References Cited

U.S. PATENT DOCUMENTS

| 4,501,845 A * | 2/1985 | Baus et al. ..................... 524/460 |
| 4,536,060 A | 8/1985 | Takamatsu et al. |
| 4,562,684 A | 1/1986 | Dreher |
| 4,608,284 A | 8/1986 | Roales |
| 4,662,965 A | 5/1987 | DiFrank et al. |
| 4,725,454 A | 2/1988 | Galli et al. |
| 4,744,918 A | 5/1988 | Heppke et al. |
| 4,879,177 A | 11/1989 | Boice |
| 5,100,963 A | 3/1992 | Lin |
| 5,156,911 A | 10/1992 | Stewart |
| 5,190,609 A | 3/1993 | Lin et al. |
| 5,229,447 A | 7/1993 | Miyajima et al. |
| 5,251,048 A | 10/1993 | Doane et al. |
| 5,292,566 A | 3/1994 | Shacklett, III |
| 5,330,961 A | 7/1994 | Takeyama et al. |
| 5,384,067 A | 1/1995 | Doane et al. |
| 5,387,450 A | 2/1995 | Stewart |
| 5,437,811 A | 8/1995 | Doane et al. |
| 5,466,496 A | 11/1995 | Jin |
| 5,626,955 A * | 5/1997 | Goetz et al. ................ 428/315.7 |
| 5,665,443 A | 9/1997 | Hata et al. |
| 5,668,614 A | 9/1997 | Chien et al. |
| 5,668,651 A | 9/1997 | Yamada et al. |
| 5,691,795 A | 11/1997 | Doane et al. |
| 5,695,682 A | 12/1997 | Doane et al. |
| 5,709,391 A | 1/1998 | Arakawa et al. |
| 5,709,937 A | 1/1998 | Adams et al. |
| 5,712,031 A | 1/1998 | Kelch et al. |
| 5,725,966 A | 3/1998 | Abe et al. |
| 5,748,277 A | 5/1998 | Huang et al. |
| 5,766,508 A | 6/1998 | Kawasumi et al. |
| 5,766,694 A | 6/1998 | West et al. |
| 5,928,803 A | 7/1999 | Yasuda |
| 5,929,960 A | 7/1999 | West et al. |
| 5,940,150 A | 8/1999 | Faris et al. |
| 5,964,975 A | 10/1999 | Hinton |
| 6,042,930 A | 3/2000 | Kelch et al. |
| 6,049,366 A | 4/2000 | Hakemi et al. |
| 6,072,549 A | 6/2000 | Faris et al. |
| 6,106,982 A | 8/2000 | Mientus et al. |
| 6,108,062 A | 8/2000 | Takeuchi et al. |

(Continued)

FOREIGN PATENT DOCUMENTS

| CN | 1201475 | 12/1998 |
| CN | 1608083 | 4/2005 |
| CN | 1791651 | 6/2006 |
| CN | 101258213 | 9/2008 |
| DE | 3909089 | 9/1990 |
| DE | 19716875 | 11/1997 |
| EP | 0317180 | 5/1989 |
| EP | 0471767 | 2/1992 |
| EP | 0498249 | 8/1998 |
| EP | 0924678 | 6/1999 |
| EP | 0951004 | 10/1999 |
| EP | 1055715 | 11/2000 |
| EP | 1116745 | 7/2001 |
| EP | 1 375 621 | 1/2004 |
| EP | 1 688 445 | 8/2006 |

(Continued)

OTHER PUBLICATIONS

Database WPI Week 199427, Derwent Publications Ltd., London, GB; AN 1994-222247, XP002477980 & JP 06 158006 (Mitsui Toatsu Chem Inc.), Jun. 7, 1994, abstract.

(Continued)

*Primary Examiner* — Alexa Neckel
*Assistant Examiner* — Marie Reddick
(74) *Attorney, Agent, or Firm* — Avery Dennison Corporation

(57) ABSTRACT

This invention relates to removable pressure sensitive adhesive compositions and constructions that contain an emulsion acrylic pressure sensitive adhesive copolymer of a plurality of acrylic monomers and at least one polymerizable acid. The invention further relates to labels, particularly removable polymeric labels for use on reusable containers.

5 Claims, 4 Drawing Sheets

(56) References Cited

U.S. PATENT DOCUMENTS

| | | | |
|---|---|---|---|
| 6,136,903 A * | 10/2000 | Su et al. .................. 524/167 |
| 6,153,288 A | 11/2000 | Shih et al. |
| 6,249,332 B1 | 6/2001 | Bryan-Brown et al. |
| 6,319,428 B1 | 11/2001 | Michot et al. |
| 6,429,961 B1 | 8/2002 | Harary et al. |
| 6,508,560 B2 | 1/2003 | Epstein et al. |
| 6,621,539 B2 | 9/2003 | Nakamura |
| 6,674,504 B1 | 1/2004 | Li et al. |
| 6,680,097 B1 | 1/2004 | Amberger et al. |
| 6,680,758 B1 | 1/2004 | Faris |
| 6,726,969 B1 | 4/2004 | Balaji et al. |
| 6,761,969 B2 | 7/2004 | Li et al. |
| 6,821,592 B2 | 11/2004 | Rodick |
| 6,927,267 B1 * | 8/2005 | Varela de la Rosa et al. .................. 526/287 |
| 7,144,542 B2 | 12/2006 | Holzer et al. |
| 7,217,463 B2 | 5/2007 | Henderson |
| 7,294,380 B2 | 11/2007 | Squier et al. |
| 8,535,464 B2 | 9/2013 | Lorence et al. |
| 2001/0003765 A1 * | 6/2001 | Mallya et al. .................. 524/710 |
| 2001/0018125 A1 | 8/2001 | Shibuya et al. |
| 2002/0084565 A1 | 7/2002 | Dautartas et al. |
| 2002/0119292 A1 | 8/2002 | Venkatasanthanam et al. |
| 2003/0083523 A1 | 5/2003 | Ando et al. |
| 2003/0150148 A1 | 8/2003 | Spear et al. |
| 2003/0193709 A1 | 10/2003 | Mallya et al. |
| 2003/0207065 A1 | 11/2003 | Sher et al. |
| 2004/0033349 A1 | 2/2004 | Henderson |
| 2004/0038026 A1 | 2/2004 | Li et al. |
| 2004/0219321 A1 | 11/2004 | Squier et al. |
| 2005/0083564 A1 | 4/2005 | Mallya et al. |
| 2005/0090619 A1 | 4/2005 | Yoshimura |
| 2006/0036556 A1 | 2/2006 | Knispel |
| 2006/0251891 A1 | 11/2006 | Aarnio |
| 2006/0263600 A1 * | 11/2006 | Bartholomew et al. .................. 428/355 AC |
| 2007/0154668 A1 | 7/2007 | Rhee et al. |
| 2007/0213449 A1 * | 9/2007 | Lewandowski et al. ..... 524/493 |
| 2008/0118740 A1 | 5/2008 | Kuwahara et al. |
| 2009/0218307 A1 | 9/2009 | Davies et al. |
| 2009/0233067 A1 | 9/2009 | Doornheim et al. |
| 2010/0285249 A1 | 11/2010 | Mitchell et al. |
| 2012/0018098 A1 | 1/2012 | Henderson |
| 2012/0034402 A1 | 2/2012 | Henderson |
| 2013/0008613 A1 | 1/2013 | Henderson |
| 2013/0146230 A1 | 6/2013 | Davies et al. |
| 2015/0255008 A1 | 9/2015 | Henderson |
| 2015/0279247 A1 | 10/2015 | Henderson |

FOREIGN PATENT DOCUMENTS

| | | |
|---|---|---|
| EP | 1743006 | 1/2007 |
| EP | 1866895 | 12/2007 |
| GB | 2259291 | 3/1993 |
| GB | 2411877 | 9/2005 |
| GB | 2411881 | 9/2005 |
| GB | 2424865 | 10/2006 |
| GB | 2425107 | 10/2006 |
| JP | 5-173487 | 7/1993 |
| JP | 6-266288 | 9/1994 |
| JP | 9-251272 | 9/1997 |
| JP | 11-057558 | 3/1999 |
| JP | 11-246395 | 9/1999 |
| JP | 11-273636 | 10/1999 |
| JP | 2000-144086 | 5/2000 |
| JP | 2000-271204 | 10/2000 |
| JP | 2002-071204 | 3/2002 |
| JP | 2002-322448 | 11/2002 |
| KR | 10-0369453 | 1/2003 |
| MX | 2007008258 | 8/2007 |
| RU | 2160932 | 12/2000 |
| RU | 26272 | 11/2002 |
| WO | WO92/13901 | 8/1992 |
| WO | WO93/23496 | 11/1993 |
| WO | WO95/34263 | 12/1995 |
| WO | WO97/11996 | 4/1997 |
| WO | WO98/38547 | 9/1998 |
| WO | 99/19415 | 4/1999 |
| WO | WO99/58421 | 11/1999 |
| WO | WO99/63400 | 12/1999 |
| WO | WO00/13887 | 3/2000 |
| WO | WO00/13888 | 3/2000 |
| WO | WO00/60407 | 10/2000 |
| WO | 01/42325 | 6/2001 |
| WO | WO01/40853 | 6/2001 |
| WO | 01/59024 | 8/2001 |
| WO | WO02/42832 | 5/2002 |
| WO | WO02/074874 | 9/2002 |
| WO | WO03/087251 | 10/2003 |
| WO | WO03/099953 | 12/2003 |
| WO | WO2004/061037 | 7/2004 |
| WO | WO2004/092295 | 10/2004 |
| WO | WO2005/085381 | 9/2005 |
| WO | WO2006/033925 | 3/2006 |
| WO | 2006/076327 | 7/2006 |
| WO | WO2006/078038 | 7/2006 |
| WO | WO2006/106309 | 10/2006 |
| WO | WO2007/030583 | 3/2007 |
| WO | WO2008/093333 | 8/2008 |
| WO | WO2008/124581 | 10/2008 |
| WO | WO2009/043975 | 4/2009 |
| WO | WO2010/027507 | 3/2010 |
| WO | WO2010/117767 | 10/2010 |
| WO | WO2010/117771 | 10/2010 |
| WO | WO2010/117774 | 10/2010 |
| WO | WO03/029002 | 4/2013 |

OTHER PUBLICATIONS

International Search Report issued in corresponding PCT/US2007/083312 dated May 16, 2008.

International Preliminary Report on Patentability issued in corresponding PCT/US2007/083312 dated Oct. 16, 2008.

Wood et al., "5.1: Large Area, High Resolution Portable ZBD Display", SID 02 Digest, ISSN/002-0866X/02/3301-0022-$1.00 © 2002 SID, pp. 22-25.

Pentermann et al., Letters to Nature, "Single-substrate liquid-crystal displays by photo-enforced stratification", Nature/vol. 417/May 2, 2002/www.nature.com, © 2002 Maxmillan Magazines Ltd., pp. 55-58.

Polylactic Acid Technology; http://www.jimluntllc.com/pdfs/polylactic_acid_technology.pdf, 2005.

The Engineering Toolbox; http://engineeringtoolbox.com/linear-expansion-coefficients-d_95.html, 2013.

Wypych, George (2012), Handbook of Polymers . . . ChemTec Publishing, Online version available at: http://www.knovel.com.web.portal/browse/display?_EXT_KNOVEL_DISPLAY_bookid=5141&verticalID=0.

TOPAS 8007S datasheet, available at http://www.topas.com/sites/default/files/TDS_8007S_04_e_1.pdf (2014).

TOPAS 9506F-500 datasheet, available at http://www.topas.com/sites/default/files/TDS_9506F-500_e_0.pdf (2014).

* cited by examiner

EMULSION ADHESIVE FOR WASHABLE FILM

CROSS REFERENCE TO RELATED APPLICATION

This application claims the benefit of International Application No. PCT/US2007/083312, which was published in English on May 15, 2008. International Application No. PCT/US2007/083312 claims priority from U.S. Application No. 60/864,028 filed Nov. 2, 2006, both of which are hereby incorporated by reference in their entireties.

FIELD OF THE INVENTION

The invention relates to acrylic emulsion pressure sensitive adhesives, and more particularly, to acrylic adhesives for use in removable polymeric film labels.

BACKGROUND

It is common practice to apply labels to containers or bottles formed from polymers or glass. Such containers and bottles are available in a wide variety of shapes and sizes for holding many different types of materials such as detergents, chemicals, motor oil, beverages, including juices, soft drinks, alcoholic beverages, etc. The labels provide information such as the supplier of the container or the contents of the container.

Polymeric film materials and film facestocks have been described for use as labels in various fields. Polymeric labels are increasingly desired for many applications, particularly clear polymeric labels since they provide a no-label look to decorated glass and plastic containers. Paper labels block the visibility of the container and/or the contents in the container. Clear polymeric labels enhance the visual aesthetics of the container, and therefore the product, and are growing much faster than paper labels in the package decoration market as consumer product companies are continuously trying to upgrade the appearance of their products. Polymeric film labels also have superior mechanical properties, such as tensile strength and abrasion resistance.

In the bottled beverage industry, particularly the bottled beer industry, the standards to which the labels are held can be quite stringent. For example, the labeled bottles must withstand the pasteurization process. The labels must be abrasion resistant because of the demands of the bottling, packing, shipping and storage processes. The labels must also survive being immersed in ice water for extended periods of time.

In addition, the bottles used in the beverage industry are generally reused many times. The bottles must be cleaned and the labels removed prior to refilling and relabeling the bottles. Paper labels, while being generally less aesthetically desirable, are easily removed during the washing process in which the bottles are subjected to hot washing liquid such as dilute caustic soda that has been heated to 50-90° C. Because polymeric labels do not possess the water permeability of the paper labels, the polymeric labels have been found to be more difficult to completely remove with the existing washing process.

Accordingly, it would be desirable to produce polymeric film labels that can be completely removed from the bottles during the washing process, yet maintain their superior aesthetic and mechanical properties. It would also be desirable to produce a polymeric label having a pressure sensitive adhesive that is capable of being coated onto the polymeric film at high speeds and that can be quickly and cleanly removed from the bottle or substrate.

SUMMARY

The present invention provides an acrylic emulsion pressure sensitive adhesive (PSA) that removes quickly and cleanly from glass and polymer-coated glass bottles in water at elevated temperatures and dilute caustic solution.

An emulsion based pressure sensitive adhesive composition is provided that comprises a pressure sensitive adhesive copolymer of a plurality of copolymerizable monomers comprising at least one polymerizable acid, wherein the composition is neutralized to a pH of greater than 4.5 with at least one hydroxy functional amine, and wherein the composition is removable upon exposure to an aqueous caustic solution at a temperature of at least 50° C.

In one embodiment, the adhesive composition includes a pressure sensitive adhesive copolymer comprising a copolymer of (a) about 75% to about 90% by weight of one or more alkyl acrylates having from about 4 to about 12 carbon atoms in the alkyl group; (b) about 0.25% to about 5% by weight of one or more acid monomers; (c) about 10% to about 20% by weight of at least one hard monomer; (d) 0 to about 1% by weight of at least one multifunctional cross-linking monomers.

The pressure sensitive adhesive is particularly useful for a removable label for reusable containers. In one embodiment, there is provided a removable label comprising: (a) a first polymeric layer having a first coefficient of thermal expansion; (b) a second polymeric layer having a second coefficient of linear thermal expansion underlying the first polymeric layer, wherein the first coefficient of linear thermal expansion is less than the second coefficient of linear thermal expansion; and (c) an adhesive layer underlying the second polymeric layer, the adhesive layer comprising an emulsion based pressure sensitive adhesive composition comprising a pressure sensitive adhesive copolymer of a plurality of copolymerizable monomers comprising at least one polymerizable acid; wherein the composition is neutralized to a pH of greater than 4.5 with at least one hydroxy functional amine; and wherein the label is reversibly curled toward the first polymeric layer at a temperature at or above 50° C. and the adhesive is removable upon exposure to an aqueous caustic solution at a temperature of at least 50° C.

In another embodiment, there is provided a removable label comprising: (a) a polymeric layer comprising at least one shrinkable film wherein the film is stretched in at least one direction; (b) an adhesive layer underlying the polymeric layer, the adhesive layer comprising an emulsion based pressure sensitive adhesive composition comprising a pressure sensitive adhesive copolymer of a plurality of copolymerizable monomers comprising at least one polymerizable acid; wherein the composition is neutralized to a pH of greater than 4.5 with at least one hydroxy functional amine; and wherein the polymeric layer irreversibly shrinks at a temperature at or above 50° C. and the adhesive is removable upon exposure to an aqueous caustic solution at a temperature of at least 50° C.

DETAILED DESCRIPTION

Figure 1A:
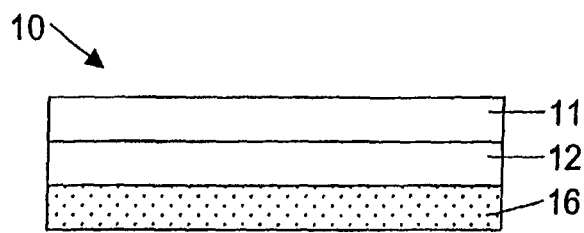
FIG. 1A is a cross section of a label construction of the present invention.

In one embodiment of the present invention, the acrylic emulsion pressure sensitive adhesive contains a pressure sensitive adhesive copolymer of a plurality of copolymerizable monomers. The copolymerizable monomers include (a) one or more alkyl acrylates having from about 4 to about 12 carbon atoms in the alkyl group; (b) one or more acid monomers; (c) at least one hard monomer; and (d) optionally, at least one multifunctional crosslinking monomers.

The acrylic emulsion pressure sensitive adhesive copolymer, in one embodiment, comprises a plurality of copolymerizable monomers, the major portion of which is one or more alkyl acrylates having about 4 to about 12 carbon atoms in the alkyl group. Non-limiting examples of alkyl acrylates having about 4 to about 12 carbon atoms in the alkyl group include butyl acrylate, hexyl acrylate, heptyl acrylate, n-octyl acrylate, iso-octyl acrylate, 2-ethylhexyl acrylate, isobutyl acrylate and nonyl acrylate. In one embodiment, the copolymer comprises about 75% to about 90% by weight of the alkyl acrylate having from about 4 to about 12 carbon atoms in the alkyl group. In another embodiment, the copolymer comprises about 77% to about 85% by weight of the alkyl acrylate.

The copolymer comprises about 0.25% up to about 5% by weight, or from about 0.5% to about 3% by weight of at least one unsaturated carboxylic acid containing from 3 to about 8 carbon atoms. Non-limiting examples of ethylenically unsaturated carboxylic acids include acrylic acid, methacrylic acid, beta-carboxyethyl acrylate, itaconic acid and beta-carboxyethyl acrylate.

As used herein, the term "multifunctional crosslinking monomer" means a monomer that is copolymerizable with acrylic monomers and that has at least one carbon-carbon double bond and at least one other functional group capable of entering into a polymerization or crosslinking reaction. In one embodiment, the copolymer comprises up to about 1% by weight of at least one multifunctional crosslinking monomer. In another embodiment, the copolymer comprises up to about 0.5%, or from about 0.01% to about 0.5% by weight of at least one multifunctional crosslinking monomer. Non-limiting examples of such monomers include multifunctional (meth)acrylates, e.g., diacrylates, triacrylates, dimethyacrylates, and trimethylacrylates; multifunctional allylic compounds, e.g., diallyl maleate and allyl methacrylate; multifunctional crosslinking monomers having a vinyl group; and multifunctional crosslinking monomers having a reactive heteroatom-containing functional group such as the imidazolidone group. A non-limiting list includes the following:

TABLE 1

| Multifunctional Monomer | Abbreviation |
| --- | --- |
| Allyl Methacrylate | AMA |
| Diallyl Maleate | DAM |
| Divinyl Benzene | DVB |
| Ethylene Glycol Dimethacrylate | EGDMA |
| N,N'-methylene-bis-acrylamide | NNMBA |
| Diallyl Phthalate | DAP |
| Butanediol Diacrylate | BDD |
| Hexanediol Diacrylate | HDDA |
| Tripropylene Glycol Diacrylate | TPGDA |
| Triallyl Cyanurate | TAC |
| Tetraethylene Glycol Diacrylate | TEGDA |
| Butanediol Dimethacrylate | BDDMA |
| Tetraethylene Glycol Dimethacrylate | TEDMA, TEGMA |
| Trimethylolpropane Triacrylate | TMPTA |
| Trimethylolpropane Trimethacrylate | TMPTMA, TRIM |
| Trimethylolpropane Diallyl Ether | TMPDAE |
| Imidazolidone Methacrylate | MEIO |

As used herein, the term "hard monomer" refers to a monomer the homopolymer of which is not inherently tacky at ambient temperatures and which has a Tg greater than about −25° C. Non-limiting examples include methyl and ethyl acrylate, methyl and ethyl methacrylate, vinyl acetate, styrene, and acrylonitrile. In one embodiment, the copolymer comprises about 10% to about 20% by weight of hard monomer, or about 15% to about 20% by weight of hard monomer.

The monomers may be polymerized in the presence of a surfactant or a mixture of surfactants. The total amount of surfactant used can be in the range of about 0 to about 7%, or about 1.3% to about 5% based on the weight of the polymer. Anionic surfactants, nonionic surfactants, and combinations thereof may be used. Suitable anionic surfactants include, for example, alkyl sulfates, alkyl phenol ethoxysulfates, alkyl sulfonates, alkaryl sulfonates and alkyl sulfosuccinates, such as for example, sodium lauryl sulfate, nonyl phenol ethoxy(4)sulfate, sodium dodecyl benzene sulfonate, disodium dioctyl sulfosuccinates, as well as mixtures thereof. Suitable nonionic surfactants include, for example, ethoxylated alkyl phenols, poly(ethylene oxide/propylene oxide) block copolymers, such as, for example, ethoxylated (10-60 moles ethylene oxide) nonyl phenol, as well as mixtures thereof.

In one embodiment, a combination of surfactants is used in the course of polymerizing the monomers, with anionic surfactants being particularly useful. In particular, a mixture of two different surfactants may be used. In one embodiment, the first type of surfactant is a sulfate of an ethoxylated alcohol, e.g., a sodium lauryl ether sulfate. Non-limiting examples include Disponil FES 77 and Disponil FES 993 from Cognis Corp. and Polystep B-19 from Stepan Company. The second type of surfactant is, in one embodiment, a sulfosuccinate or derivative, e.g., a dioctyl ester of sodium sulfosuccinic acid. Non-limiting examples include Aerosol OT-75 from Cytec Industries, Inc. and Disponil SUS IC 875 from Cognis Corp. In another embodiment, the second type of surfactant is a modified fatty alcohol polyglycolether. Non-limiting examples include Disponil AFX 1080 and Disponil AFX 2075 from Cognis Corp.

In addition to the monomers and surfactants described above, additional ingredients, reagents, processing aids, and other components are used in preparing preferred embodiments of the invention. A non-limiting list includes polymerization catalysts (initiators), chain transfer agents, neutralizers, accelerators, tackifiers, defoaming agents, thickeners or rheology modifiers, buffers, antioxidants and biocides.

Suitable thermal polymerization initiators include, but are not limited to, sodium persulfate, potassium persulfate, ammonium persulfate, sodium perborated, and ammonium or alkali metal peroxy disulfate salts. The initiator may be used alone or in combination with a minor amount of one or more reducing components or activators, such as, for example sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids.

A chain transfer agent may be employed in the preparation of the adhesive. The weight average molecular weight (Mw) of the emulsion polymer may be adjusted through the addition of a chain transfer agent, such as n-dodecyl mercaptan, during emulsion polymerization to give a suitable balance of adhesive and cohesive strength. Suitable chain transfer agents include, but are not limited to, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate. According to one embodiment of the invention, chain transfer agent is not required but in some embodiments it is used in an amount of from 0.001 to 0.5, including from 0.0025 to 0.1, moles per kg dry polymer weight. Linear or branched $C_4$-$C_{22}$ alkyl mercaptans such as n-dodecyl mercaptan and t-dodecyl mercaptan are particularly useful.

In the preparation of the acrylic emulsion polymer, a neutralizer is included. By "neutralizer", what is meant is a basic material that is capable of entering into an acid-base reaction with the acid monomer. Suitable neutralizers include poly-hydroxy functional amines, such as for example, triethanolamine, 2-[bis-(2-hydroxyethyl)-amino]-2-hydroxymethyl propane-1,3-diol (bis tris methane), 2-amino-2-(hydroxymethyl)-1,3-propanediol (trizma base), N-methyl-D-glucamine, N,N,N'N'-tetrakis-(2-hydroxyethyl)-ethylenediamine and N,N,N'N'-tetrakis-(2-hydroxypropyl)-ethylenediamine.

An organic salt, for example, sodium citrate, sodium gluconate or sodium acetate may be used in combination with the neutralizer to enhance the removability of the adhesive. An inorganic acid salt may also be used. Alternatively, an organic acid neutralized by a hydroxy amine can be used. Non-limiting examples of organic acids include acetic acid, p-toluene sulfonic acid, citric acid, gluconic acid, maleic acid and dodecylbenzene sulfonic acid. The organic acids can be either added to the water phase during the polymerization or added post polymerization.

Chemical crosslinkers may or may not be present in the composition. If present, the external crosslinkers are provided in an amount up to about 5 by weight, based on the weight of dry adhesive, to further increase the cohesive strength. Non-limiting examples of external crosslinkers include chromium acetate, zirconium ammonium carbonate, aluminum acetate, polyaziridines, carbodiimides and the like. For polyaziridines, the amount of crosslinker used is typically less than about 1% by weight, or about 0.6% or less by weight, based on the weight of dry adhesive.

The adhesive composition may contain, in addition to the emulsion acrylic copolymer, an emulsifiable wax and a plasticizer. Non-limiting examples of emulsifiable waxes include emulsified petroleum resins, paraffin waxes, oxidized paraffin waxes, microcrystalline waxes, carnauba waxes, montan waxes, polyethylene waxes, and the like. Non-limiting examples of plasticizers include phthalates, such as butyl benzyl phthalate, and dioctyl phthalate; adipates; benzoates; citrates, such as triethyl citrate and acyl tributyl citrate; maleates; oleates; phosphates; sebacates; stearates; epoxidized vegetable oils; rosin derivatives, and polymeric plasticizers, such as low molecular weight acrylic polymers that lower the Tg and storage modulus of the PSA.

The pressure sensitive adhesives can be applied to a release liner or facestock using conventional methods. For example, the PSA can be applied to a release liner using slide coating, multilayer die coating, die/slide combination coating and the like, and then laminated to a facestock.

While adhesive coat weights can vary considerably, depending upon the facestock and intended application, in general, the adhesive is applied to a dry coat weight of from about 12 to about 25 grams per square meter ($g/m^2$), or from 13 to about 21 $g/m^2$.

A wide variety of facestocks or backings, including paper and polymeric film facestocks, are contemplated for use with the adhesive composition. The facestock may be primed or unprimed. The facestock may be surface treated by, for example, corona discharge, flame, plasma, etc, to provide the surfaces with desirable properties such as improved adhesion to subsequently applied layers. Procedures for corona treating and flame treating of polymeric films are a well known to those skilled in the art.

The term "overlies" and cognate terms such a overlying and the like, when referring to the relationship of one or a first layer relative to another or a second layer, refer to the fact that the first layer partially or completely overlies the second layer. The first layer overlying the second layer may or may not be in contact with the second layer. For example, one or more additional layers may be positioned between the first and the second layer. The term "underlies" and cognate terms such as "underlying" and the like have similar meanings except that the first layer partially or completely lies under, rather than over the second layer.

The term "transparent" when referring to one or more layers of the label means any material beneath such layers can be seen through such layers. In reference to the use of the "transparent" or "clear" labels applied to clear containers, such as beer bottles, the bottle and the beer within the bottle are visible through the label.

The term "clear" when referring to one or more layers of the label or to the label itself means the opacity of the layers or label is less than about 5%, and the layers or the label has a haze of less than about 10%. Opacity is measured in accordance with TAPPI Test T425 os, and haze is measured in accordance with ASTM Test Method D-1003.

The polymeric facestock may be a monolayer film or a multilayer film. The multilayer film may comprise from two to ten or more layers. The polymer facestock may be oriented or not oriented. The polymer facestock may be transparent or opaque. Opaque facestocks generally comprise a polymer as described below and one or more pigments to provide the facestock, or one layer of a multilayer facestock with the desired color. Pigments useful for this purpose are well known in the art. For example, white films can be prepared by introducing titanium dioxide and other white pigments into the polymer. Carbon black may be introduced to provide a black or grey facestock or film.

A wide variety of polymer film materials are useful in preparing the polymeric layers useful in the present invention. For example, the polymeric film material may include polymers and copolymers such as at least one polyolefin, polyacrylate, polystyrene, polyamide, polyvinyl alcohol, poly(alkylene acrylate), poly(ethylene vinyl alcohol), poly(alkylene vinyl acetate), polyurethane, polyacrylonitrile, polyester, polyester copolymer, fluoropolymer, polysulfone, polycarbonate, styrene-maleic anhydride copolymer, styrene-acrylonitrile copolymer, ionomers based on sodium or zinc salts of ethylene methacrylic acid, cellulosics, polyacrylonitrile, alkylene-vinyl acetate copolymer, or mixtures of two or more thereof.

In one embodiment, the adhesive is applied to a reversibly curlable facestock film. Such films are described in International Publication WO2006/076327, the disclosure of which is hereby incorporated by reference. Reversibly curlable films contain at least two polymeric layers having different coefficients of linear thermal expansion, such that, upon exposure to elevated temperatures, the film is reversibly curled. These films are particularly useful for removable labels for reusable containers. The labels for reusable beverage bottles, including beer bottles, are subjected to hot, caustic washing liquid to remove the label. The temperature of the washing liquid may be greater than or equal to about 50° C., about 60° C., about 70° C., about 80° C. or higher. As the label curls or distorts, the adhesive is exposed to the washing liquid and the label is quickly and cleanly removed from the bottle.

As illustrated in FIG. 1A, label 10 comprises a first polymeric layer 11, a second polymeric layer 12 underlying polymeric layer 11, and adhesive layer 16 underlying the second polymeric layer 12. At high temperatures, e.g., at or above 50° C., the second polymeric layer 12 with the higher coefficient of thermal expansion will expand to a greater degree than the first polymeric layer 11 having the lower coefficient of thermal expansion. The greater expansion of the layer 12 causes the label to curl toward layer 11. The deformation or curl of the label is reversible and the label will revert to its original shape at room temperature. The degree of curl is a function of the film thickness, Youngs modulus and coefficient of linear thermal expansion of the polymeric layers.

Figure 1B:
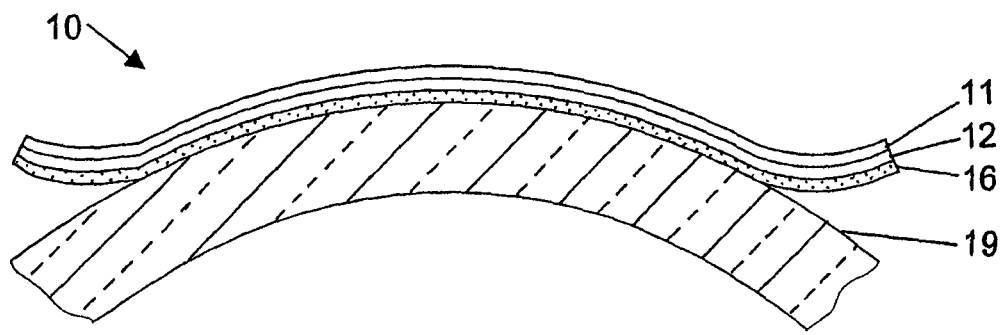
FIG. 1B is a cross section of the label of FIG. 1A as applied to a cylindrical container.

FIG. 1B shows the label of FIG. 1A bonded to the curved surface of a cylindrical container 19. In this embodiment, the main curl direction of the label extends in the circumferential direction of the container. As the container is exposed to heat, such as the hot washing liquid used in the bottling industry, the label curls toward the upper layer 11. As the label curls, the adhesive is exposed to a greater extent to the hot washing liquid and will eventually be completely removed from the container. The label of the present invention may also be applied to articles or containers that are flat, rather than cylindrical in shape.

The coefficient of thermal expansion is determined by the equation:

$$\text{Coefficient of Linear Thermal Expansion (\%)} = [(B-A)/A] \times 100 \quad (1)$$

where A and B represent the measured length (cm) of a specimen of a resin after standing at 0° C. and 50° C., respectively, for 2 minutes, the specimen being 1 cm in width, 4.5 cm in length, and not more than 0.5 cm in thickness as prepared at room temperature.

When subjected to the higher temperature, such as that of the wash liquid, the label will curl and be removed from the underlying substrate to which it is adhered provided the curl force of the label ($F_{Label}$) is greater than the peel adhesion of the label to the underlying substrate ($F_{PA}$):

$$F_{Label} > F_{PA}$$

The curl force of the label, $F_{Label}$, can be determined using the following equation:

$$F_{Label} = (\alpha_2 - \alpha_1)(T - T_0)(1/8 t)(E_1 + E_2/(E_1 + E_2)) \quad (2)$$

wherein $\alpha_2$ is the coefficient of linear thermal expansion of the bottom layer (polymeric layer 12); $\alpha_1$ is the coefficient of linear thermal expansion of the top layer (polymeric layer 11); T is the temperature of the washing liquid, $T_0$ is the temperature at which the label is made, typically, room temperature (23° C.); t is the total thickness of the label; $E_1$ is the modulus of elasticity of the top layer (polymeric layer 11) and $E_2$ is the modulus of elasticity of the bottom layer (polymeric layer 12).

In one embodiment, the difference between the coefficient of linear thermal expansion of the bottom layer and that of the top layer, $(\alpha_2 - \alpha_1)$, is greater than or equal to about $3 \times 10^{-5}$ (1/° C.). In one embodiment, $\alpha_2 - \alpha_1$ is about $7 \times 10^{-5}$ (1/° C.).

The polymeric layers useful in the present invention do not exhibit heat shrinkage beyond the typically accepted limits of heat stable pressure sensitive adhesive films, e.g., <1% at 70° C. and <2% at 100° C. In one embodiment, the polymeric layer 11 has a heat shrinkage of less than 4% at 80° C.

The polymeric layers 11 and 12 may comprise any of the polymeric film materials described above. Each of the polymeric layers 11 and 12 may be a monolayer film or a multilayer film. In one embodiment, polymeric layers 11 and 12 are coextruded. For example polymeric layers 11 and 12 may comprise a polypropylene/ethylene vinyl acetate coextrudate; a polyacrylate/polyethylene coextrudate; or a polyacrylate/ethylene vinyl alcohol coextrudate. Many other coextruded combinations are possible, including coextrudates comprising more than two layers.

In one embodiment, polymeric layer 11 and polymeric layer 12 are laminated together. Polymeric layer 12 may comprise a coextruded film or may comprise a monolayer film. Polymeric layer 11 may comprise a coextruded film or may comprise a monolayer film. Polymeric layers 11 and 12 typically have a different coefficient of linear thermal expansion in the machine direction (MD) and have a very low coefficient of linear thermal expansion in the cross direction (CD) when the curl is in the machine direction of the label. Alternatively, when the curl is in the cross direction of the label, the polymeric layers 11 and 12 have different coefficient of linear thermal expansion in the CD and have a very low coefficient of linear thermal expansion in the MD. The difference in the coefficient of thermal expansion can be obtained by using different polymeric materials, for example polyethylene for polymeric layer 12 and polyethylene terephthalate for polymeric layer 11. Alternatively, the difference in coefficient of thermal expansion can be obtained by differences in molecular orientation. For example, a cross direction (trans direction) oriented film for polymer layer 11 and a machine direction oriented film for polymer layer 12.

Figure 2:
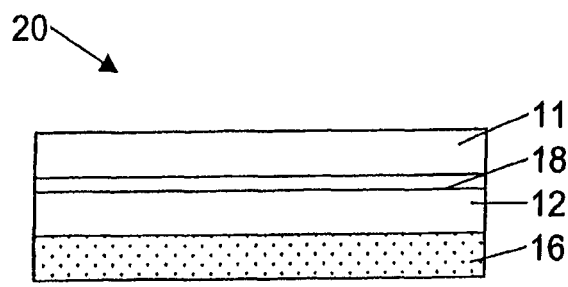
FIGS. 2-9 are cross sections of embodiments of the label constructions of the present invention.

Polymeric layers 11 and 12 may be coextruded films. Alternatively, as shown in FIG. 2, the label 20 may comprise a laminated structure wherein polymeric layer 11 is bonded to polymeric layer 12 by lamination adhesive 18. In one embodiment, polymeric layers 11 and 12 are heat sealed together.

Figure 3:
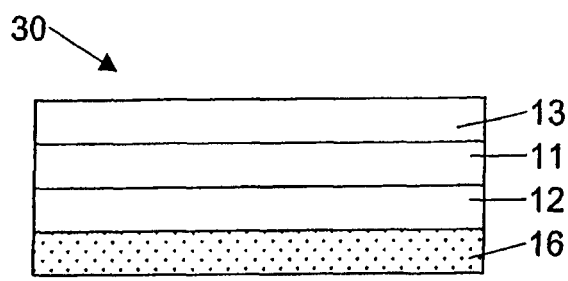
Figure 4:
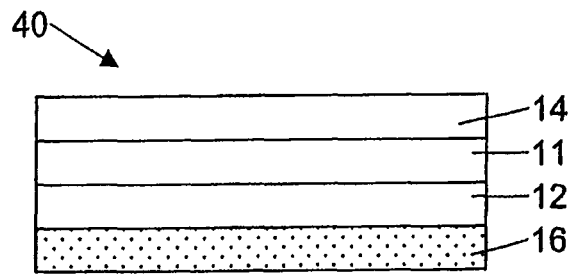

The adhesive labels of the invention may, and generally do contain other layers. For example, as shown in FIG. 3, the label 30 may contain a metal layer 13 that overlies and is in contact with first polymeric layer 11. Alternatively, a print layer 14 can be on the upper surface of polymeric layer 11 as illustrated in FIG. 4.

In one embodiment, one of polymeric layers of the label comprises a polymeric ink layer. For example, the first polymeric layer 11 may comprise a crosslinked ink that has been screen printed onto the second polymeric layer 12. Alternatively, the second polymeric layer 12 may comprise an ink layer that has been printed onto the first polymeric layer 11.

Figure 5:
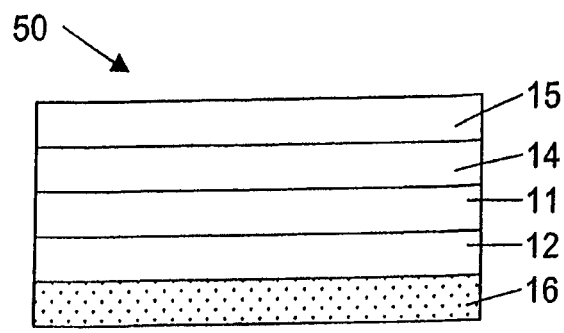

FIG. 5 illustrates label 50 which comprises first polymeric layer 11, second polymeric layer 12 underlying first polymeric layer 11, adhesive layer 16 underlying second polymeric layer 12, print layer 14 overlying first polymeric layer 11 and transparent protective layer 15 which overlies and is in contact with the upper surface of the print layer 14.

Figure 6:
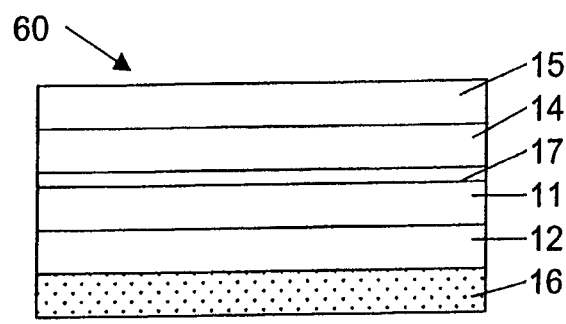

FIG. 6 illustrates label 60 which is similar to the label of FIG. 5, except that label 60 contains an additional antistatic polymer layer 17 between the print layer 14 and the first polymeric layer 11.

The labels of the invention may also contain adhesion promoting layers between one or more of the layers shown. For example, an adhesion promoting layer can be inserted between the second polymeric layer 12 and the adhesive layer 16; between the first polymeric layer 11 and the metal layer 13 or the print layer 14; etc.

Figure 7:
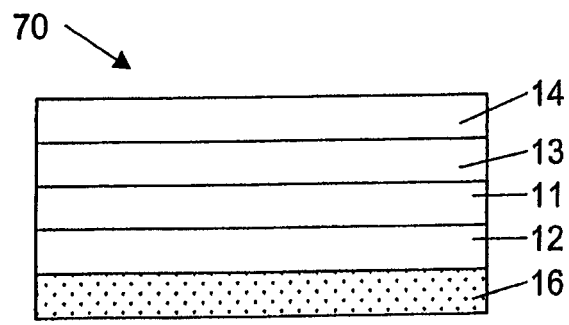
Figure 8:
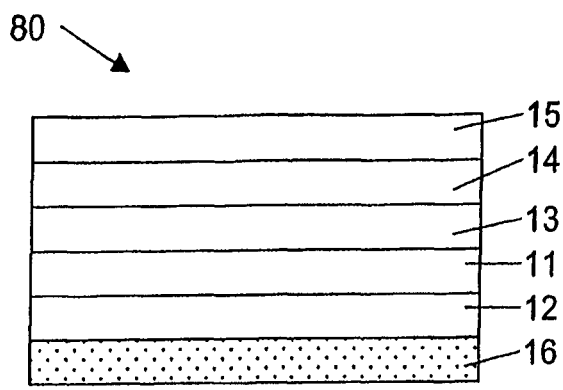

The label may also contain a metal layer. As illustrated in FIG. 7, label 70 comprises first polymeric layer 11, second polymeric layer 12 underlying first polymeric layer 11 and adhesive layer 16 underlying second polymeric layer 12. Metal layer 13 overlies first polymeric layer 11 and print layer 14 overlies metal layer 13. In FIG. 8, label 80 is similar to the label of FIG. 7 with the addition of transparent protective layer 15 overlying and in contact with print layer 14.

Figure 9:
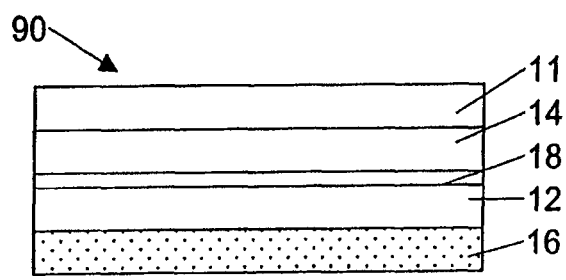

In another embodiment, illustrated in FIG. 9, the label 90 comprises a first polymeric layer 11 having an upper surface and a lower surface, a print layer 14 on the lower surface of the first polymeric layer 11. The first polymeric layer 11 with print layer 14 thereon is bonded to the second polymeric layer 12 by a lamination adhesive 18. An adhesive layer 16 is adhered to the lower surface of the second polymeric layer 12.

In one embodiment, the adhesive is applied to a shrink film facestock. Such films are stretched in at least one direction and, upon exposure to heat, shrink back. The shrinking of the film is irreversible. That is, upon cooling, the film does not expand back to its pre-heated dimensions. A PSA coated shrink label may be removed from the container or substrate to which it is applied by exposing the label to heat, for example the high temperature washing fluid, so that the label shrinks and overcomes the retention force of the adhesive label. The degree of shrinkage of the facestock film at temperatures greater than 50° C., or 60° C. or 70° C. is greater than about 5% in one embodiment, or greater than about 10%, or about 15 to 20% or more.

In one embodiment, the PSA label is attached to the circumferential surface of a cylindrical container, wherein the shrinkage label film is stretched in at least the circumferential direction. Examples of shrinkage films include, but are not limited to, monoaxially or biaxially stretched shrinkable polyvinyl chloride, polyester, polyethylene terephthalate, polyolefin, polyethylene, polypropylene, acetate, cocyloolefin copolymer films and combinations of two or more of these.

EXAMPLES

The following examples illustrate several non-limiting embodiments of the invention, its preparation, and performance.

Examples A-D

Preparation of Base Polymers

Base polymers are prepared by free-radical emulsion polymerization according to the following procedure, using the components identified in Table 2.

TABLE 2

| Component | Polymer A | Polymer B | Polymer C | Polymer D | Stage |
|---|---|---|---|---|---|
| | | mass (g) | | | |
| de-ionized water | 417.10 | 376.40 | 373.92 | 384.12 | initial reactor loading |
| potassium persulfate | 4.76 | 4.55 | 4.74 | 0 | |
| ammonium persulfate | 0 | 0 | 0 | 4.69 | |
| de-ionized water | 198.56 | 220.28 | 223.85 | 226.61 | pre-emulsion |
| Disponil FES 77 | 69.78 | 70.73 | 69.42 | 68.75 | |
| Disponil SUS IC 875 | 13.08 | 13.14 | 12.96 | 12.84 | |
| citric acid monohydrate | 0 | 0 | 30.16 | 31.47 | |
| 2-ethylhexyl acrylate | 1312.35 | 1323.70 | 1306.23 | 1293.52 | |
| methyl methacrylate | 194.43 | 295.56 | 193.94 | 192.05 | |
| methyl acrylate | 97.10 | 0 | 96.97 | 96.03 | |
| acrylic acid | 16.30 | 16.42 | 16.20 | 16.05 | |
| EGDMA | 0.57 | 0 | 0 | 0 | |
| DAM | 0 | 6.57 | 2.42 | 2.39 | |
| n-dodecyl mercaptan | 0.28 | 0 | 0 | 0 | |
| de-ionized water | 116.96 | 118.85 | 116.41 | 119.23 | initiator solution |
| potassium persulfate | 4.76 | 4.55 | 4.74 | 0 | |
| ammonium persulfate | 0 | 0 | 0 | 4.69 | |
| Acticide LA | 1.17 | 2.52 | 2.42 | 2.39 | biocide |
| de-ionized water | 52.80 | 46.74 | 45.62 | 45.17 | rinsing |
| TOTAL | 2500.00 | 2500.00 | 2500.00 | 2500.00 | |

A reactor equipped with a stirrer, heat source and nitrogen inlet is purged with nitrogen and charged with water, then heated to 78° C. Potassium persulfate or ammonium persulfate is added to the reactor, and the reactor contents are mixed for five minutes. Thereafter, the pre-emulsion mixture is fed into the reactor over a 230 minute period. The temperature of the reactor batch is allowed to rise to 79-81° C. and then maintained at that temperature throughout the polymerization reaction. An initiator solution feed is commenced after the pre-emulsion feed begins. Twenty-five minutes after the pre-emulsion feed is complete, the initiator feed is complete and the reactor contents are held at 79-81° C. for 60 minutes. The reactor contents are then allowed to cool, and when the temperature reaches 38° C., a biocide is added. The rinse water is used throughout the process to wash out the various feed vessels and lines, and to rinse the reactor at the end of the polymerization. Base Polymer A has a solids content of about 66% and a pH of 1.8.

Examples 1-8

Preparation of Pressure Sensitive Adhesive

Using the Base Polymers described above, a series of pressure sensitive adhesive compositions are prepared by compounding the base polymer and neutralizing it with a hydroxy functional amine or blend thereof. In several examples, a salt from an organic acid is used.

Table 3 identifies the neutralizing agent, and the salt, if any, used to produce the adhesive compositions of Examples 1-8 and Comparative Example A. Examples 1-7 are prepared using Base Polymer A. Example 8 is prepared using Base Polymer B. Comparative Example A is Base Polymer A neutralized with ammonia. The amount of neutralizing agent and salt listed is in parts by weight per 100 parts dry polymer.

The abbreviations used below are as follows:
Bis Tris Methane 2-[bis-(2-hydroxyethyl)-amino]-2-hydroxymethyl propane-1,3-diol
TEA triethanolamine
Trizma 2-amino-2-(hydroxymethyl)-1,3-propanediol
NMDG N-methyl-D-glucamine
HEEDA N,N,N',N'-tetrakis-(2-hydroxyethyl)-ethylenediamine
HPEDA N,N,N',N'-tetrakis-(2-hydroxypropyl)-ethylenediamine
Na-Cit sodium citrate dihydrate
Na-Glu sodium gluconate
ammonia 12% ammonia Each of the adhesives of Examples 1-8 and Comparative Example A is coated onto a siliconized polyester liner at a coat weight of 20 grams per square meter (g/m$^2$), and then transferred onto a curling film of the type shown in FIG. 1A. Labels measuring 50 mm×50 mm are adhered to glass bottles (from Supplier I) of 63 mm diameter and allowed to sit for at least 1 day at room temperature prior to testing. The curvature of the label, when heated, is opposite the curve of the glass bottle.

The wash-off test consists of immersing the labeled glass bottle in a 2% sodium hydroxide solution at 80° C. The label was examined after 1, 3 and 5 minute intervals. If the label is not washed off, the amount of lift in mm (total of both sides of the label) is measured. A value of 50 mm would mean that the label has been washed off. Each adhesive formulation was tested twice. The labels employing the adhesives having hydroxy functional amine neutralized copolymers have improved removability in hot caustic water, yet the adhesive strength of the adhesive, i.e., the peel strength, is not adversely affected.

Examples 9-12

Preparation of Pressure Sensitive Adhesive

Using Base Polymer A, pressure sensitive adhesive compositions are prepared substantially in accordance with the procedure of Example 1 with the exception that varying amounts of a carbodiimide crosslinker (Carbodilite E-02 from Nisshinbo Industries) is used.

Each of the adhesives of Examples 1 and 9-12 is coated onto a siliconized polyester liner at a coat weight of 15 grams per square meter (g/m$^2$), and then transferred onto a curling film of the type shown in FIG. 1A. Labels measuring 50 mm×50 mm are adhered to glass bottles (from Supplier II) of 58 mm diameter and allowed to sit for at least 1 day at room temperature (RT) and for 1 day at 50° C. prior to testing. The curvature of the label, when heated, is opposite the curve of the glass bottle. Table 4 shows the results of the wash-off tests and the 900 peel tests performed in accordance with FINAT FTM 2.

TABLE 3

| Example | Neutralizing Agent(s) | | Salt | | 1 min. | 3 min. | 5 min. |
|---|---|---|---|---|---|---|---|
| 1 | Bis Tris Methane | 3.24 | Na-Cit | 2.98 | 25 | 35 | 45 |
|  |  |  |  |  | washed off | — | — |
| 2 | Bis Tris Methane | 1.52 | Na-Cit | 2.98 | washed off | — | — |
|  | TEA | 3.30 |  |  | washed off | — | — |
| 3 | Trizma | 1.52 | — | — | 10 | 15 | 25 |
|  |  |  |  |  | 45 | washed off | — |
| 4 | Trizma | 2.28 | — | — | 40 | 45 | washed off |
|  |  |  |  |  | 15 | washed off | — |
| 5 | Trizma | 1.52 | Na-Cit | 2.98 | 7 | 25 | 40 |
|  |  |  |  |  | 45 | washed off | — |
| 6 | NMDG | 2.02 | — | — | 2 | 5 | 10 |
|  |  |  |  |  | 40 | washed off | — |
| 7 | NMDG | 2.53 | Na-Glu | 1.49 | 30 | 45 | washed off |
|  |  |  |  |  | washed off | — | — |
| 8 | NMDG | 1.59 | — | — | washed off | — | — |
|  |  |  |  |  | washed off | — | — |
| Comp. A | Ammonia | 0.70 | — | — | 2 | 4 | 6 |
|  |  |  |  |  | 2 | 4 | 6 |

TABLE 4

| Example | Wt % active crosslinker on dry adhesive | 90° Peel 24 h at RT [N/25 mm] | Wash-Off 24 h at RT [5 × 5 cm] | 90° Peel 24 h at 50° C. [N/25 mm] | Wash-Off 24 h at 50° C. [5 × 5 cm] |
|---|---|---|---|---|---|
| 1 | 0% | 6.4 cl* | 33/15 | 8.1 cl | 140/160 |
| 9 | 1% | 6.1 cl | 16/9 | 7.3 cl | 39/30 |
| 10 | 2% | 4.7 cl | 12/9 | 6.4 cl | 58/37 |
| 11 | 3% | 3.7 cl | 9/8 | 5.8 cl | 29/180 |
| 12 | 4% | 2.7 cl | 7/7 | 4.3 cl | 34/14 |

*cl = clean peel, no adhesive transfer or splitting

The wash-off test consists of immersing the labeled glass bottle in a 2% sodium hydroxide solution at 80° C. The time in seconds for the label to completely wash off of the bottle is measured. Each adhesive formulation was tested twice. The addition of an external crosslinker improves wash-off, particularly on aged samples (1 day at 50° C.).

Examples 13-15

Preparation of Pressure Sensitive Adhesives

Example 13 is prepared substantially in accordance with the procedure of Example 1, with the exception that Base Polymer C is used. Examples 14 and 15 are prepared substantially in accordance with the procedure of Example 1, with the exception that Base Polymer D is used. Base Polymers C and D both include an organic acid in the polymerization pre-emulsion.

Each of the adhesives of Examples 13-15 is coated onto a siliconized polyester liner at a coat weight of 20 grams per square meter (g/m²), and then transferred onto a curling film of the type shown in FIG. 1A. Labels measuring 50 mm×50 mm are adhered to glass bottles (from Supplier II) of 58 mm diameter and allowed to sit for at least 1 day at room temperature (RT) and for 3 days at 50° C. prior to testing. The curvature of the label, when heated, is opposite the curve of the glass bottle. Table 5 indicates the neutralizing agent(s) used and shows the results of the wash-off tests and the 900 peel tests. The amount of neutralizing agent listed is in parts by weight per 100 parts dry polymer.

TABLE 5

| Example | Neutralizing Agent(s) | | 90° C. Peel 24 h at RT [N/25 mm] | 90° C. Peel >72 h at 50° C. [N/25 mm] | Wash Off >72 h at 50° C. |
|---|---|---|---|---|---|
| 13 | Bis Tris Methane | 2.94 | 3.5 cl | 6.1 cl | 40/45 |
|  | TEA | 3.30 |  |  |  |
| 14 | Bis Tris Methane | 2.94 | 3.8 cl | 10.4 cl | 15/35 |
|  | TEA | 3.30 |  |  |  |
| 15 | HEEDA | 3.20 | 3.9 cl | 9.2 cl | 35/45 |
|  | TEA | 2.89 |  |  |  |

The wash-off test consists of immersing the labeled glass bottle in a 2% sodium hydroxide solution at 80° C. The time in seconds for the label to completely wash off of the bottle is measured. Each adhesive formulation was tested twice. The wash off times for the labels remains low after ageing and the peel strength is more stable after ageing than adhesives wherein no organic acid is added to the pre-emulsion and no external crosslinker is used.

While the invention has been explained in relation to embodiments, it is to be understood that various modifications thereof will become apparent to those skilled in the art upon reading the specification. Therefore, it is to be understood that the inventions disclosed herein is intended to cover such modifications as fall within the scope of the appended claims, and to cover insubstantial variations thereof.

What is claimed is:

1. An acrylic emulsion based pressure sensitive adhesive composition comprising;
   a pressure sensitive adhesive copolymer of copolymerizable monomers including
   (a) at least one alkyl acrylate having from about 4 to about 12 carbon atoms in the alkyl group;
   (b) at least one acid monomer;
   (c) at least one hard monomer, wherein a homopolymer of the hard monomer is not inherently tacky at ambient temperatures and has a Tg greater than −25° C.; and
   (d) optionally, at least one multifunctional crosslinking monomer;
   wherein the copolymer is neutralized to a pH of greater than 4.5 with a neutralizer, the neutralizer including at least one of 2-[bis-(2-hydroxyethyl)-amino]-2-hydroxymethyl propane-1,3-diol, 2-amino-2-(hydroxymethyl)-1,3-propanediol, N-methyl-D-glucamine, N,N,N',N'-tetrakis-(2-hydroxyethyl)-ethylenediamine, and N,N,N',N'-tetrakis-(2-hydroxypropyl)-ethylenediamine; and
   wherein the composition is washed off upon exposure to an aqueous caustic solution at a temperature of at least 50° C.;
   wherein the at least one alkyl acrylate is selected from butyl acrylate, hexyl acrylate, heptyl acrylate, n-octyl acrylate, iso-octyl acrylate, isobutyl acrylate, 2-ethylhexyl acrylate, and nonyl acrylate, and combinations of two or more thereof;
   wherein the at least one acid monomer is selected from acrylic acid, methacrylic acid, itaconic acid, beta-carboxyethyl-acrylate, and combinations of two or more thereof;
   wherein the at least one hard monomer is selected from methyl and ethyl acrylate, methyl and ethyl methacrylate, vinyl acetate, styrene, and combinations of two or more thereof; and
   wherein the multifunctional crosslinking monomer is selected from diallyl maleate, ethylene glycol dimethacrylate, tripropylene glycol diacrylate, allyl methacrylate, divinyl benzene, N,N'-methylene-bis-acrylamide, triallylcyanurate, and combinations of two or more thereof.

2. The composition of claim 1, wherein the copolymer comprises (a) about 75% to about 90% by weight of the at least one alkyl acrylate having from about 4 to about 12 carbon atoms in the alkyl group; (b) about 0.25% to about 5% by weight of the at least one acid monomer; (c) about 10% to about 20% by weight of the at least one hard monomer; (d) 0 to about 1% by weight of the at least one multifunctional crosslinking monomer, wherein the weight is based on the total weight of the monomers.

3. The composition of claim 1 wherein the neutralizer comprises 2-[bis-(2-hydroxyethyl)-amino]-2-hydroxymethyl propane-1,3-diol.

4. The composition of claim 1 further comprising an external crosslinking agent, wherein the external crosslinking agent is selected from chromium acetate, zirconium ammonium carbonate, aluminum acetate, polyaziridines, carbodiimides and combinations thereof.

5. The composition of claim 1 further comprising an organic acid neutralized by the neutralizer, wherein the organic acid is selected from acetic add, p-toluene sulfonic acid, citric acid, gluconic acid, maleic acid, dodecylbenzene sulfonic acid and combinations thereof.

* * * * *